Feb. 10, 1953   J. C. MILLER   2,627,747
METER WITH INTERCHANGEABLE DIAL AND REGISTER
Filed Jan. 27, 1947   2 SHEETS—SHEET 1
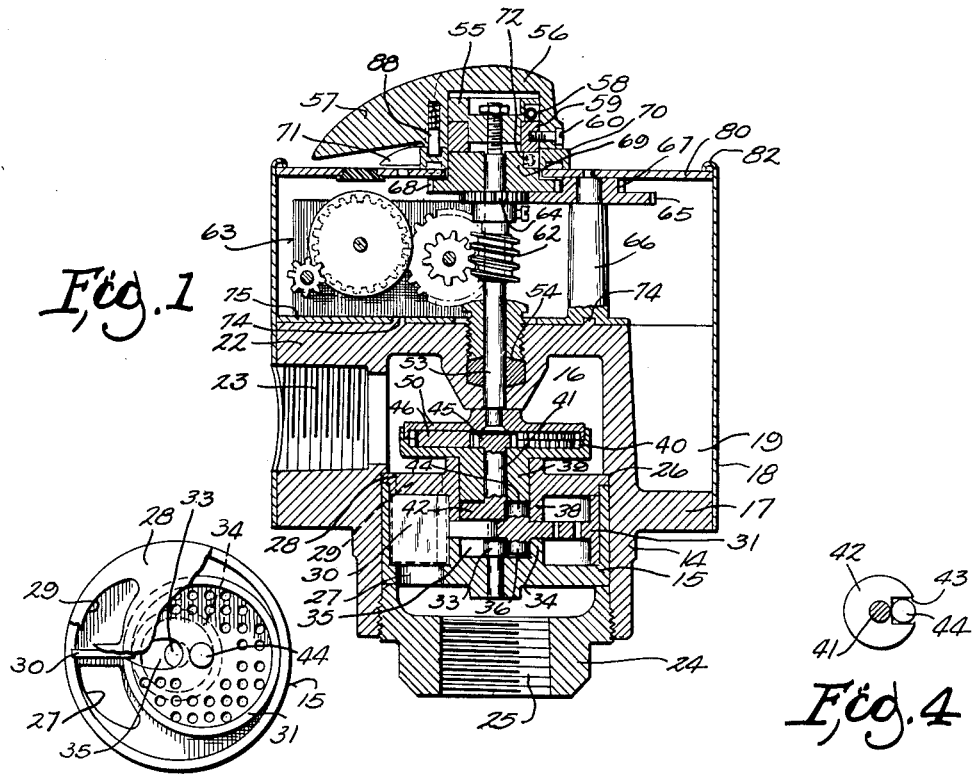
INVENTOR
JACOB C. MILLER
BY Wheeler, Wheeler & Wheeler
ATTORNEYS Feb. 10, 1953

J. C. MILLER 2,627,747

METER WITH INTERCHANGEABLE DIAL AND REGISTER

Filed Jan. 27, 1947

INVENTOR
JACOB. C. MILLER
BY Wheeler, Wheeler & Wheeler
ATTORNEYS

Patented Feb. 10, 1953

2,627,747

UNITED STATES PATENT OFFICE 2,627,747

METER WITH INTERCHANGEABLE DIAL AND REGISTER

Jacob C. Miller, Milwaukee, Wis., assignor to Badger Meter Manufacturing Company, Milwaukee, Wis., a corporation of Wisconsin Application January 27, 1947, Serial No. 724,620

15 Claims. (Cl. 73—257)

This invention relates to improvements in meters.

The meter in which the invention is embodied is particularly adapted to be used in the metering of oils and greases, but it has also a wide variety of other uses.

It is a primary object of the invention to provide a simple, inexpensive, and accurate meter having component parts which may be die cast, and which are assembled in a manner permitting a wide variety of changes to be made for different types of meters. Die casting is an economical operation only where large quantities of parts are to be required. By using the die cast parts interchangeably in a wide variety of meters, I make it possible to take advantage of this mode of construction.

It is a further object of the invention to provide a novel and improved organizational assembly, using an external shell to hold the various interchangeable parts in selective positions on the die cast unit of the meter.

It is a further object of the invention to provide a novel and improved driving arrangement and a novel and improved resetting arrangement for meters of this character.

Still other objects will be more apparent from the following disclosure of the invention.

In the drawings:

Fig. 1 is a view in axial section through a meter embodying the invention.

Fig. 2 is a plan view of the meter shown in Fig. 1, portions of the pointer knobs being broken away to expose the over-running clutch.

Fig. 3 is a plan view of the motor which drives the meter as it appears with all but a small fragment of the cover removed.

Fig. 4 is a detail view in plan of the part driven by the motor, the driven shaft being shown in section.

Fig. 5 is a detail view in plan of one of the meter pointers and its driving part, a portion of the pointer being broken away, and a fragment of the meter dial being illustrated therebeneath.

Fig. 6 is an inverted plan view of the meter pointer shown in Fig. 5.

Fig. 7 is an enlarged, detail view showing, partially in side elevation, and partially in section, the relation of the respective pointers to each other and to the dial.

Fig. 10 shows a somewhat modified form of meter using, however, the die cast base unit above referred to.

Figure 8:
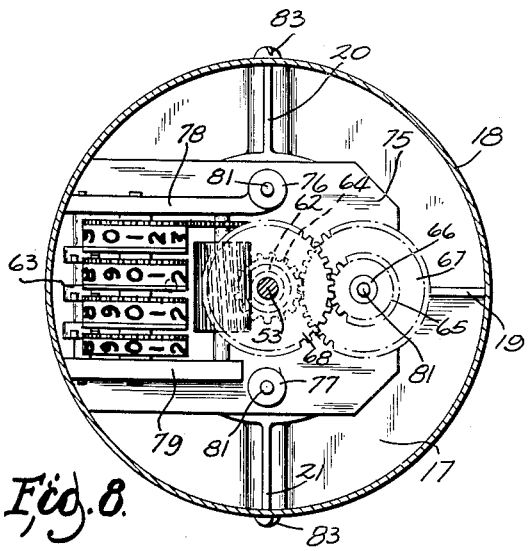
Fig. 8 is a plan view of the apparatus shown in Fig. 1 with the dial removed, and a shell illustrated in section.

The base unit for the various embodiments of my invention comprises the housing member 14 which is preferably die cast in one piece to provide a chamber for the motor casing 15, a chamber 16 for the reduction gear set hereinafter, to be described, an annular flange at 17 to which the shell 18 is fastened, and a number of radial webs 19, 20, 21 for securely positioning such shell. There is also at 22 a radially extending boss, sufficiently large to provide a threaded socket 23 serving as an outlet coupling from chamber 16.

Into the bottom of the cast unit 14 is threaded a plug 24 which has a threaded socket at 25 providing inlet coupling. The plug not only provides the inlet coupling, but is screwed upwardly against the motor casing 15 to hold such casing tightly against the shoulder 26.

While the motor may be of any conventional design, and preferably comprises the well-known type illustrated, its construction and operation will be briefly described.

The motor casing 15 has an inlet 27 in its bottom, and it is provided with a top 28 which affords an outlet 29. Extending vertically within the casing between the inlet 27 and the outlet 29 is a partition 30. Since the cylindrical piston 31 is so mounted that it can move only orbitally about the casing 15, with its periphery in substantial contact with the inner wall of casing 15, it follows that the material admitted through the inlet 27 can only pass through the outlet 29 by driving the piston orbitally about the casing.

To guide the piston, the following means is provided: There is a center post 33 fixed in the bottom of casing 15, and from which the annular flange 34 is spaced to provide an annular channel 35. The piston carries at its center a downwardly projecting pin 36, guided in the said channel for orbital movement around the center post 33.

The cover 28 for the motor casing 15 provides at 38 a sleeve within which the hub 39 of the fixed gear 49 is disposed. This hub provides a bearing for the output shaft 41 of the motor. As best shown in Fig. 4, this shaft carries at its lower end a disk 42, which is rotatable within the sleeve 33 and is radially notched at 43 to receive a pin 44 which projects upwardly from the center of the cylindrical piston 31, being opposite to the downwardly projecting pin 36. Thus, the orbital movement of the cylindrical piston under pressure of material admitted at 25 and entering the motor through port 27 causes the cylinder to move orbitally and thereby develops rotative movement of the motor shaft 41.

Figure 12:
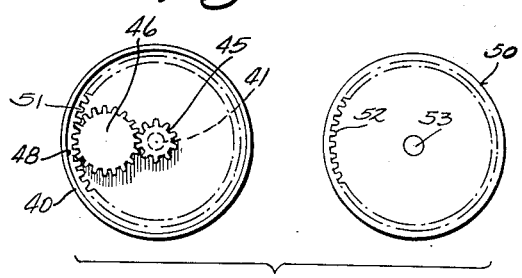
Fig. 12 shows, in relatively separated positions, the component parts of reduction gearing employed between the motor and the registering parts of the meter, a fixed, internal gear and driving pinions being shown in plan, and the driven internal gear being shown in inverted plan.
Figure 13:
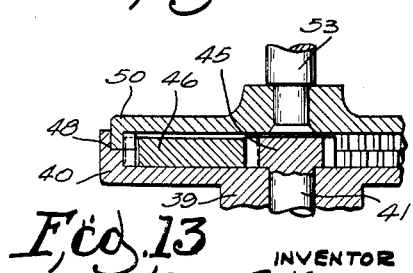
Fig. 13 is an enlarged, detail view in section showing, on larger scale than Fig. 1, the assembled gears of the gear reduction set.

The top of shaft 41 carries a driving pinion 45, as best shown in Fig. 13. Meshing with this pinion is a floating gear 46 which has no shaft and simply rests on the bottom of the ring gear 49, as shown in Figs. 12 and 13. The diameter of gear 46 is such that it meshes with pinion 45 and with ring gear 49. The stationary ring gear is shouldered at 48, and within the shoulder is fitted another ring gear 50 which differs slightly from the stationary gear 49 in the number of teeth. The floating gear 46 is high enough in its axial extent to mesh with both of the ring gears.

In practice, I provide the stationary ring gear 49 with fifty-three teeth 51, and I provide the driven ring gear 50 with fifty-two teeth 52. As the pinion 45 rotates, the planetary floating gear 46 is constrained by its engagement with the teeth 51 of the fixed gear 49 to move orbitally. Since it also meshes with the teeth 52 of the driven gear 50, and since the driven gear has a different number of teeth from the stationary gear 49, the effect of the orbital movement of the planetary gear 46 is to rotate the driven gear 50 by an amount which, in each complete orbital movement of planetary gear 46, will equal the difference in the number of teeth. In the disclosed device, the driven gear 50 will be rotated for just one tooth upon each such orbital movement. In the particular device disclosed, five and one-half rotations of the pinion 45 and the shaft 41 are required to produce a movement of the shaft 53 equal to one tooth of driven gear 50.

While it is recognized that this type of gear reduction transmission is old per se, it is of particular utility in the meter organization disclosed because it achieves directly, and without any other gearing whatever, the entire reduction from the motor to at least one of the meter register pointers. Moreover, it does this between two axially aligned shafts, this being of advantage in a meter of the design herein disclosed.

The shaft 53, to which the gear 50 is connected, passes upwardly through the packing gland 54 and has screwed to its upper end a pointer actuator 55. The lock nut 55' is used to hold the actuator 55 in the position to which it is adjusted in its threaded connection with shaft 53. The knob 56, carrying pointer 57, encircles the actuator 55 and is driven therefrom in the direction of shaft rotation by a ball clutch 58 of conventional design, the clutch being shown in Fig. 1 and Fig. 2. As shown in Fig. 2, the pointer cannot be advanced respecting the shaft but is rotatable counter-clockwise for resetting. Although the drive is in the relative direction in which clutch overrun may occur, the spring bias on the ball develops more than adequate driving friction to actuate the pointer clockwise.

To hold the knob 56 in place on its actuator 55, I provide a collar 59 which is disposed in an undercut channel beneath actuator 55, and to which the knob is held by screw 60. Thus, as above indicated, there is a direct drive from the motor to the pointer 57 through only a single reduction gear set.

Where a totalizer is desired, I provide the shaft 53 with a worm gear 62 which drives the totalizer 63, as shown in Fig. 1. Further reference will be made to the manner in which the totalizer is mounted.

Where a second pointer is desired, as to indicate gallons of material metered (assuming that the pointer 57 shows quarts), I may mount on shaft 53 a driving pinion 64, which meshes with a gear 65 supported by a shoulder on post 66. A pinion 67 integral with gear 65 drives gear 68, which is integral with a pointer actuator 69, upon which is mounted the hub 70 of pointer 71. A ball clutch 72, as shown in Fig. 5, drives the pointer 71 from the actuator 69. This clutch functions in the same manner as clutch 58 hereinbefore described. The ratio between pinion 64 and gear 65 is a ratio of one to two, and the ratio between the gear 68 and pinion 67 is likewise a ratio of one to two, so that the pointer 71 is driven one-fourth as rapidly as the pointer 57. For different quantities, different ratios would obviously be used.

Figure 9:
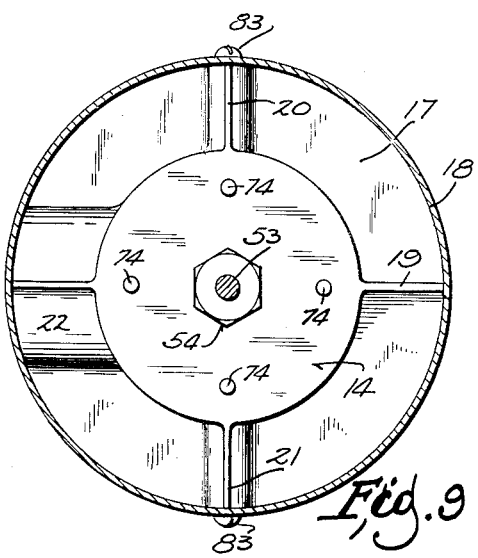
Fig. 9 is a plan view of the die cast unit from which the totalizer base shown in Fig. 8 has been removed, the shell being illustrated in section.

The top of the base casting 14 is provided, at points which are preferably equally spaced, with upstanding pegs 74. In Fig. 9, I have shown four such pegs to be used. The mounting plate 75 has sockets with which these upstanding pegs register in the manner best shown in Fig. 1. This mounting plate is preferably also die cast, and it is conveniently made in such a manner, that above certain of the sockets, and in line with the respective peg 74 of the base casting, there are posts 66, 76, and 77, integral with the plate. The post 66 has already been described. It is shouldered to provide a bearing and a seat for the gear 65 and pinion 67. The post 76 may have formed integrally with it, a wall 78 which comprises one side of the totalizer unit, the several shafts required for an otherwise conventional unit having bearings in this integral wall. The opposite wall 79 of the totalizer unit is fastened independently to the base plate 75.

The post 77 has no function other than to cooperate with posts 76 and 66 in the support of the dial 80.

Figure 10:
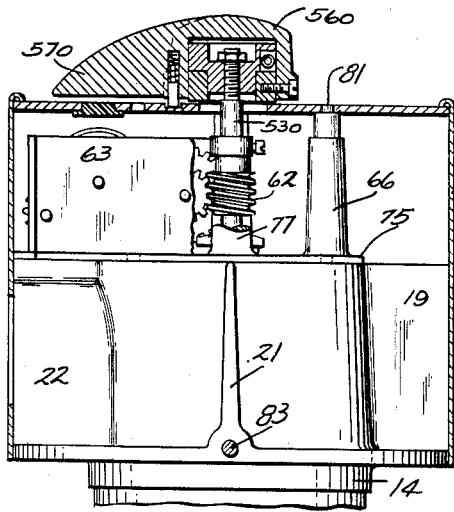

Each of the posts last mentioned has its top end reduced in diameter to comprise a pin 81, as best shown in Figs. 1 and 8. The dial 80 has holes in which the pins 81 are received in the manner indicated in Fig. 1, and by means of which the dial position is fixed when the dial is indexed to a desired position respecting the posts. The external shell 18 has its top margin rolled or beaded inwardly, as shown at 82, to engage the dial. The shell in turn is held by screws 83 (Fig. 8) to the base casting, thereby securely holding the dial, and the totalizing register, and the mounting plate 75 in place upon the base casting 14. While the anchorage is an unusually rigid one, it is nevertheless very easily possible, by merely removing screws 83 and the knob, to lift the dial and the mounting plate 75 and all of the intervening mechanism, and to rotate these to a new position on the base member in order that the dial may have the position most convenient for use. The equal, angular spacing between the pegs 74 permits this adjustment and assures that the parts will be as rigidly fixed in their new positions as in their original positions.

Where one pointer is sufficient, a slightly shorter shaft 53a is substituted, as in Fig. 10, for the shaft 53, and a slightly different form of knob 560 and pointer 570 may be used in lieu of knob 56 and pointer 57. The gear train which comprises pinion 64, gear 65, pinion 67, and gear 68 is omitted, together with the pointer actuator 69, and the pointer carrier 70, and pointer 71. Thus, with the omission of the parts not needed, and very slight changes in but few of the remaining parts, a different style of meter is had.

Figure 11:
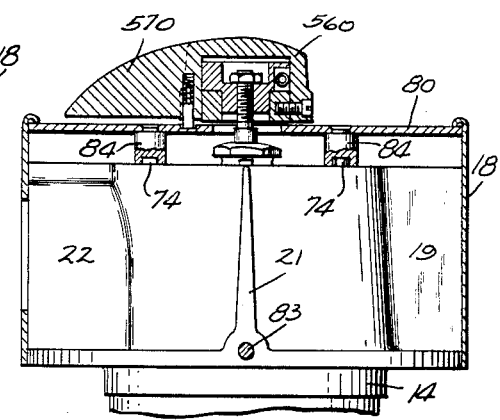
Fig. 11 shows a further modified meter using the same die cast base unit with a modified shell.

Another style of change is shown in Fig. 11, where the totalizing register 63 has been completely omitted, along with the mounting plate 75. A shorter shell 18 holds the dial disk 80 in a position determined by the spacers 84 which are socketed to receive the pegs 74, formerly engaged with the mounting plate.

Where both pointers are used, as in the preferred construction shown in Fig. 1, it is desirable to provide means whereby the knob 56 may be used to re-set both pointers simultaneously to the zero starting point on the dial. The dial 80 is provided at 85 with an arcuately shaped ratchet tooth with which the spring pawl 86 of the pointer carrier 70 is engageable when such carrier is rotated reversely to the starting point. On the upper surface of the carrier 70 is a similar ratchet tooth at 87 with which the spring biased plunger 88 in the knob 56 is engageable when the knob is rotated reversely with respect to the direction in which it is spaced by the shaft. In the direction of shaft operation, the respective ball clutches frictionally engage and impositively operate the carrier 70, and the knob 56, and the respective pointers. When it is desired to re-set the meter to the starting point, the knob 56 is clasped and rotated reversely toward the starting point. Wherever its plunger 88 encounters the tooth 87 of the carrier 70, the knob picks up such carrier and rotates it with the knob toward the starting point. When the starting point is reached, the engagement of the spring pawl 86 with ratchet tooth 85 in the dial disk 80 brings both pointers to rest.

As compared with most meters, the construction herein disclosed not only has few parts, but it employs one or two die cast parts in various organizations to produce a variety of meter types, thus facilitating the economical die cast production of these larger parts in large quantities.

The assembly is such that the shell which encloses the totalizing register serves as a means for maintaining the organization in assembly, while facilitating changes in design or changes in location of the dial and the meter pointers to facilitate the convenience of the operator in a particular installation.

It will, of course, be understood that the particular design changes illustrated are merely by way of exemplification, and that various changes relating both to structure, and to the design of the various alternative assemblies, may be made within the scope of the appended claims. It is further contemplated that many advantages of this invention may be achieved without necessarily making the base unit 14 of a die casting or other type of casting.

I claim:

1. In a meter, the combination with a hollow base unit and a meter shell, the base unit being provided with shell positioning flanges and containing a motor, a reduction gear set, and a meter shaft extending upwardly from the base unit, of locating pegs projecting upwardly from the base unit at spaced points about said shaft, dial supporting means socketed to engage said pegs, and a dial mounted on said means and engaged by said shell whereby said dial is held in position on said base by said shell, said shell and base having securing screws.

2. The combination set forth in claim 1 in which said pegs are equidistant from the shaft and are located on radii having equal angles therebetween, whereby said supporting means and dial may be adjusted respecting the base to a plurality of angular positions.

3. The combination set forth in claim 1 in which the dial supporting means comprises posts socketed to receive the respective pegs and provided at their upper ends with pins, said dial having apertures engaged on said pins.

4. The combination set forth in claim 1 in which the dial supporting means comprises a mounting plate socketed to receive said pegs, and posts, said posts having terminal pins with which said dial is engaged.

5. The combination set forth in claim 1 in which said dial supporting means comprises a plate socketed to receive said pegs and provided with an upstanding flange, together with a totalizing register for which said flange constitutes one wall, said register comprising another wall having independent connection with said plate.

6. In a meter, the combination with a base member provided with a meter passage, a motor having a shaft, and an output shaft having a driving connection from the motor shaft, of a dial co-axial with the shafts, a support carrying the dial from the base, said support having releasable connecting means with the dial upon which the dial is angularly adjustable, and a shell marginally connected with the dial and enclosing the dial and the support and at least a part of the base, said base comprising means for positioning said shell in clamping relation to the dial and said connecting means, and said shell having releasable means connecting it with the base whereby the shell may be released to unclamp the dial.

7. The combination set forth in claim 6 in which the support and the dial are indexably movable respecting the base upon release of the shell from the base.

8. The combination set forth in claim 6 in which the support and the dial are indexably movable respecting the base upon release of the shell from the base, the base having locating pegs, and the dial support having complementary sockets adapted to pre-determine various relative positions of the support respecting the base.

9. The combination set forth in claim 6 in which the dial and the base have respective peg and socket locating means with which a variety of supports are interchangeably engageable.

10. The combination set forth in claim 6 in which said driving connections comprising a reduction gear set, and said output shaft being aligned with the motor shaft, said output shaft extending centrally through said shell and support and dial and being provided externally of the dial with a pointer and driving means therefor.

11. In a meter, the combination with a base unit provided with a meter passage and a motor therein, and an output meter shaft, of a dial, a dial support mounted on the base unit and comprising a shouldered post, a pointer provided with a hub mounted directly on said shaft, a second pointer rotatable co-axially with the first mentioned pointer and provided with a separate hub, and a gear train connecting said second hub with said shaft and including a gear mounted on the shoulder of said post, said dial being provided with a ratchet stop tooth opposed to the direction of pointer rotation, said second pointer having a pawl engageable with said tooth when rotated oppositely to its normal direction of rotation, and a pawl and ratchet connection for transmitting motion from the first pointer to the second pointer when the first pointer is rotated opposite to its normal direction of rotation.

12. In a meter comprising a dial and two pointers, a re-setting device comprising over-running clutch means for each of said pointers permitting reverse rotation thereof, a stop tooth on the dial, a pawl carried by one of said pointers and engageable with said stop tooth when said last mentioned pointer is reversely rotated, and pawl and ratchet means engageable between the first and second pointers in the reverse rotation of the first pointer whereby to transmit reverse rotative movement from the first pointer to the second pointer, said dial tooth limiting the extent of the conjoint reverse movement of said pointers.

13. In a meter, the combination with a base unit provided internally with a meter passage, of a motor in said passage, shaft means extending from said motor and projecting from the base unit, a dial support mounted on the base unit, the base unit and dial support respectively having dowel and socket means symmetrically positioned about the shaft means to define a plurality of angularly indexed positions of the support respecting the base unit, means for selectively connecting said dial support to the base unit in one of said positions, a dial on the support in a position of adjustment determined by the position of the support, and a pointer on the shaft means movable across the dial.

14. In a meter, a base unit comprising a casting having a water passage with an internal shoulder therein, a motor having a casing seated against the shoulder, a plug threaded into said housing and holding said motor casing to the shoulder, said plug having a water inlet coupling leading to said passage and the housing having an outlet laterally from said passage, a gear reducer having a casing in the passage and confined between the casting and the motor casing, said reducer including a gear set in driven connection with the motor and provided with an output shaft projecting from the casting opposite the inlet, a dial support element and dial element mounted on the casting, a pointer on the shaft operable over the dial element, and a shell embracing the base unit casting and shouldered in engagement with the dial element and constituting means for holding the dial element and support element and base unit in assembly.

15. The device of claim 14 including cooperating parts on said casting and one of said elements for defining a plurality of dial positions indexed about said shaft.

JACOB C. MILLER.

REFERENCES CITED

The following references are of record in the file of this patent:

UNITED STATES PATENTS

| Number | Name | Date |
|---|---|---|
| 476,101 | Thomson | May 31, 1892 |
| 501,203 | Bassett | July 11, 1893 |
| 520,195 | Thomson | May 22, 1894 |
| 714,823 | Samain | Dec. 2, 1902 |
| 1,079,103 | Bowser | Nov. 18, 1913 |
| 1,565,793 | Chrisman | Dec. 25, 1925 |
| 1,608,059 | De Borde | Nov. 23, 1926 |
| 1,608,231 | Bradley | Nov. 23, 1926 |
| 1,870,155 | Weymouth et al. | Aug. 2, 1932 |
| 2,025,849 | Cornell | Dec. 31, 1935 |
| 2,059,433 | Bradley | Nov. 3, 1936 |
| 2,309,332 | Tancred | Jan. 26, 1943 |

FOREIGN PATENTS

| Number | Country | Date |
|---|---|---|
| 507,041 | Great Britain | June 8, 1939 |